US012514410B1

(12) United States Patent
Manuel

(10) Patent No.: US 12,514,410 B1
(45) Date of Patent: Jan. 6, 2026

(54) TWO-SIDED PERSONAL DISPOSABLE SANITARY WIPE AND DRY DEVICE

(71) Applicant: Kimber Manuel, Belleview, FL (US)

(72) Inventor: Kimber Manuel, Belleview, FL (US)

(*) Notice: Subject to any disclaimer, the term of this patent is extended or adjusted under 35 U.S.C. 154(b) by 431 days.

(21) Appl. No.: 18/085,704

(22) Filed: Dec. 21, 2022

(51) Int. Cl.
*A47K 10/16* (2006.01)
*C11D 17/04* (2006.01)

(52) U.S. Cl.
CPC ............ *A47K 10/16* (2013.01); *C11D 17/049* (2013.01)

(58) Field of Classification Search
CPC .... A45D 2200/1045; A45D 2200/1018; A45D 34/04; A47L 13/17; A47L 23/10; A47K 7/03; A47K 10/16; B08B 1/143; B08B 1/14; A61M 35/006; C11D 17/049
USPC ........................................................ 15/104.93
See application file for complete search history.

(56) References Cited

U.S. PATENT DOCUMENTS

| | | | | |
|---|---|---|---|---|
| 5,595,807 A | | 1/1997 | Gooding, Jr. et al. | |
| 7,482,021 B1 | | 1/2009 | Tison et al. | |
| 2006/0251464 A1* | | 11/2006 | Bauer | B08B 1/14 401/205 |
| 2011/0217895 A1* | | 9/2011 | Peterson | A47L 13/16 442/401 |

* cited by examiner

*Primary Examiner* — Katina N. Henson
(74) *Attorney, Agent, or Firm* — Sanchelima & Associates, P.A.; Jesus Sanchelima; Christian Sanchelima

(57) ABSTRACT

A two-sided personal disposable sanitary wipe and dry device including a cleaning assembly, a drying assembly, and a protection barrier assembly. The protection barrier assembly includes a wet protection layer, an outer pull tab and an inner pull tab. The cleaning assembly includes a wet wipe that is attached to the wet protection layer. The drying assembly includes a dry wipe wherein is attached to the wet protection layer oppositely where the wet wipe is attached. The wet protection layer is made of an impermeable material and prohibits dirt from traveling from the wet wipe to the dry wipe and vice versa. The outer pull allows the wet protection layer to roll up the wet wipe for disposing, wherein the inner pull tab allows the user to access the dry wipe for drying.

7 Claims, 5 Drawing Sheets

TWO-SIDED PERSONAL DISPOSABLE SANITARY WIPE AND DRY DEVICE

FIELD OF THE INVENTION

The present invention relates to two-sided personal disposable wipe and more particularly to a two-sided personal disposable sanitary wipe and dry device that allows having a wet wipe and a dry wipe into one enhancing sanitization by rolling up the dirty side after use for disposal.

DESCRIPTION OF THE RELATED ART

Several designs for sanitary wipes have been designed in the past. None of them, however, include a disposable wipe which contains a cleaning layer, a drying layer along with a protection barrier.

Applicant believes that a related reference corresponds to U.S. Pat. No. 7,482,021 issued for two-sided wipe for cleaning and dry a skin surface. Applicant believes that another related reference corresponds to U.S. Pat. No. 5,595,807 issued for combination wet dry wipe. None of these references, however, teach of a disposable two-sided wipe wherein one side is impregnated with a liquid solution and the other side is dry and the wipe can be used to clean, along with a protective barrier.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an improved sanitary wipe for private areas that would offer cleaning, drying and disposal.

It is another object of this invention to provide a device that reduces the risk of odors, irritations, rashes, infections, and sores.

It is still another object of the present invention to eliminate the need to use separate wet and dry wipes.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
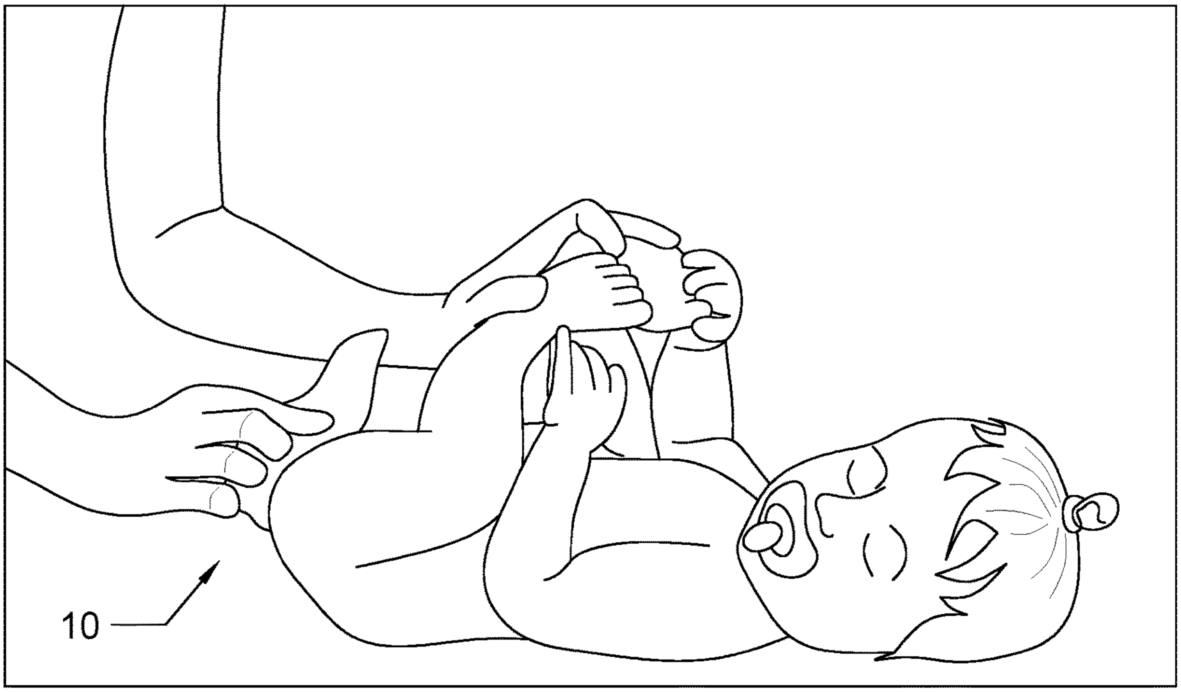
FIG. 1 represents an operational view of an exemplary embodiment of the present invention 10.

Referring now to the drawings, where the present invention is generally referred to with numeral 10, it can be observed that it basically includes, a cleaning assembly 20, a drying assembly 40 and a protection barrier assembly. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

A cleaning assembly 20 includes a wet wipe 22, wherein said wet wipe 22 may have a rectangular shape, a circular shape, a square shape, a regular shape, an irregular shape, or any other suitable variation thereof. In a suitable embodiment, the wet wipe 22 may be made of a paper material, a cotton material, a polyethylene material, a polypropylene material, or any other suitable material variation thereof that permits absorption of a liquid substance. It is a preferred embodiment that the wet wipe 22 is capable of maintaining a dampened state while a cleanser liquid substance is impregnated on a proximal surface of the wet wipe 22. In an exemplary embodiment the total area of the wet wipe 22 may be suitable for a hand's user is capable of handling. In a suitable embodiment, the wet wipe 22 may be disposable. It should be considered that the wet wipe 22 may have a textured surface to enhance dirt removal while cleaning.

The present invention 10 further includes a drying assembly 40, wherein said dry wipe 42 may have a rectangular shape, a circular shape, a square shape, a regular shape, an irregular shape or any other suitable variation thereof. In a suitable embodiment, the dry wipe 42 may be made of a paper material, a cotton material, a polyethylene material, a polypropylene material, or any other suitable material variation thereof that permits absorption of a liquid substance, a moisture substance or any other variation thereof. It is a preferred embodiment that dry wipe 42 is capable of retaining a liquid substance after being in contact thereof. In an exemplary embodiment the total area of the dry wipe 22 may be suitable for a hand's user is capable of handling. In a suitable embodiment, the dry wipe 42 may be disposable. The dry wipe 42 may be symmetric or asymmetric in accordance with the shape of the wet wipe 22. It should be considered that the dry wipe 42 may have a textured surface to enhance dirt removal while cleaning.

In an exemplary embodiment, the present invention includes a protection barrier assembly 60, wherein the protection barrier assembly further includes a wet protection layer 62. In a suitable embodiment, the protection barrier assembly 60 may have a rectangular shape, a circular shape, a square shape, a regular shape, an irregular shape, or any other suitable variation thereof. The protection barrier layer 62 may be made of a polyester film, a polypropylene film, a cotton material, a rayon fiber material, or any other suitable material known in the art that may be impermeable. In a preferred embodiment, the wet protection layer 62 may have a symmetrical shape with respect to the shape of the dry protection barrier 62 and/or wet wipe, nonetheless, it should be considered that another shape with a suitable area to receive the dry wipe 42 and the wet wipe 22 may be considered for the wet protection layer.

Figure 2:
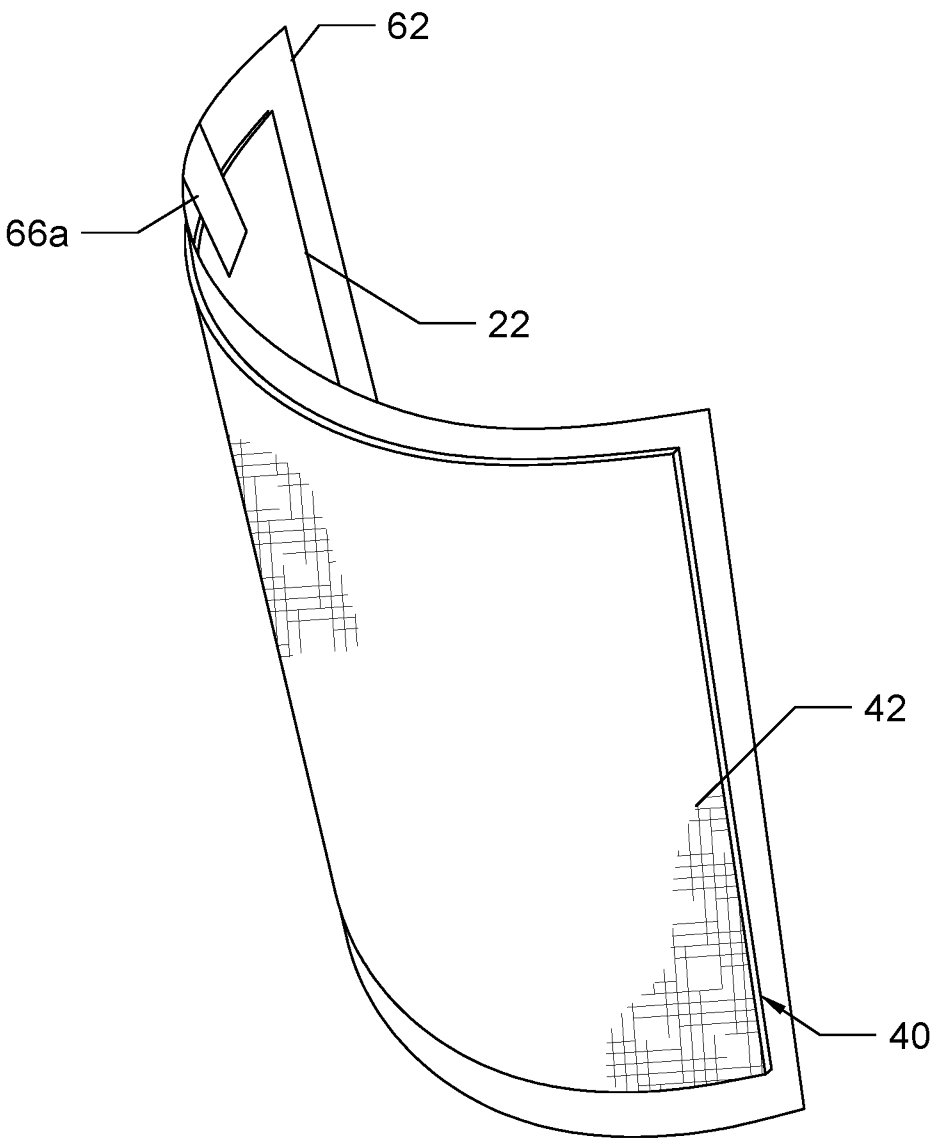
FIG. 2 shows a perspective view of the present invention 10, wherein the wet wipe 22, and the dry wipe 42 are attached to each side of the wet protection layer 62 respectively.
Figure 3:
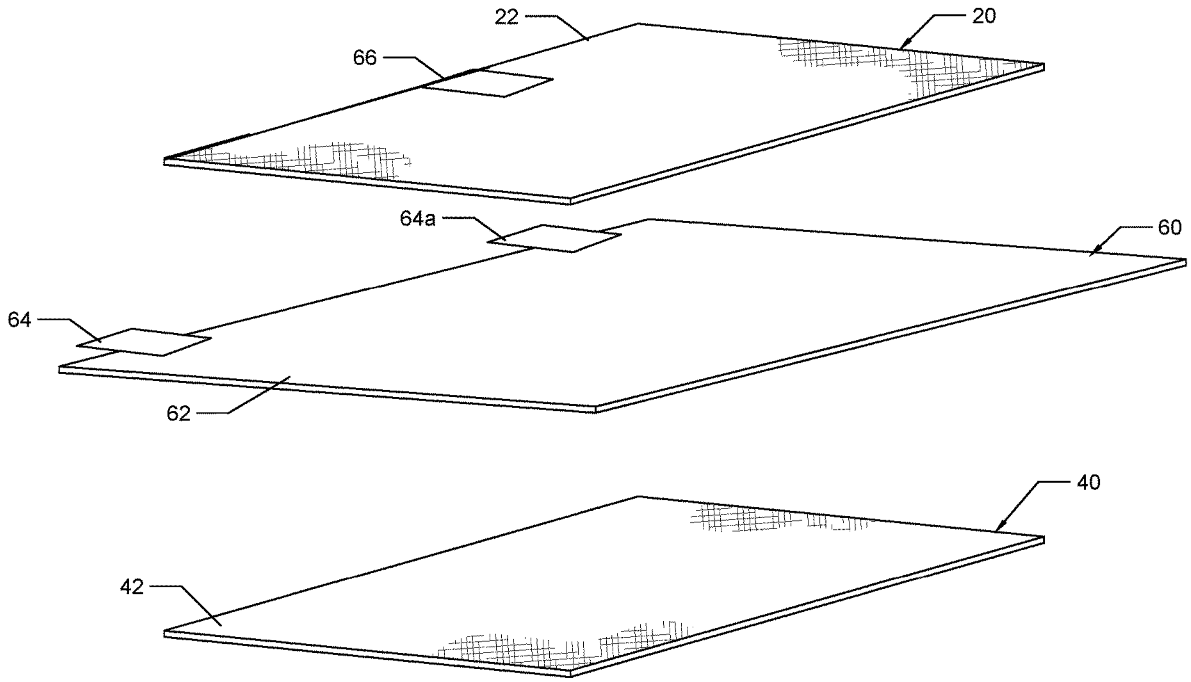
FIG. 3 illustrates an exploded view of the present invention 10, wherein the wet protection layer 62 is placed between the wet wipe 22 and the dry wipe 42 and further includes an outer pull tab 64 and may include a plurality of outer pull tabs 64*a*.
Figure 4:
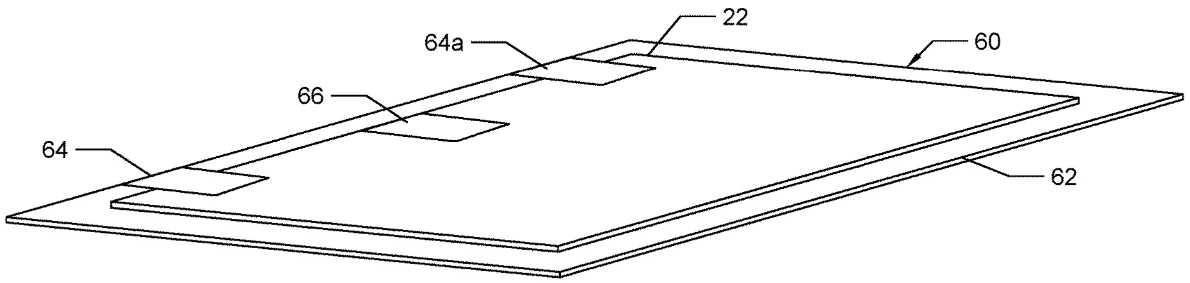
FIG. 4 is an isometric view of the present invention 10, wherein the wet protection layer 62 prevents the dry wipe 42 to be wet by means of the wet wipe 22.

FIG. 2 represents a wet wipe 22 attached to a rear surface of the wet protection layer 62 and the dry 42 wipe is attached to a front said thereof, wherein the wet wipe includes an inner pull tab 66 attached at a front side thereof to be handled by the user. FIG. 3 illustrates the wet protection layer 62 including an outer pull tab attached to a front portion thereof, wherein the wet protection layer 62 may include a plurality of outer pull tabs 64*a*. The outer pull tab and the plurality of outer pull tabs 64*a* may be used to roll back the wet wipe, said outer pull tab 64 and said plurality of pull tabs 64*a* are made of a plastic material that prevents to get dirt or wet, thereby the user may handle the present invention by means of the pull tab 64. In other embodiment, the inner pull tab 66 may be configured to be handled by the user to access the dry wipe 42.

Best depicted in FIG. 1, represents the present invention 10 assembled, wherein the wet wipe 22 may be used to clean a predetermined surface, wherein the liquid solution impregnated into the wet wipe for cleaning and/or cleansing, may be configured to be used on the user's skin, thereby the inner pull tab 66 may be rolled back to access the dry wipe 42 and may be used to remove the moisture left by the wet wipe 22, then the present invention 10 may be rolled up to be disposed.

Figure 5A:
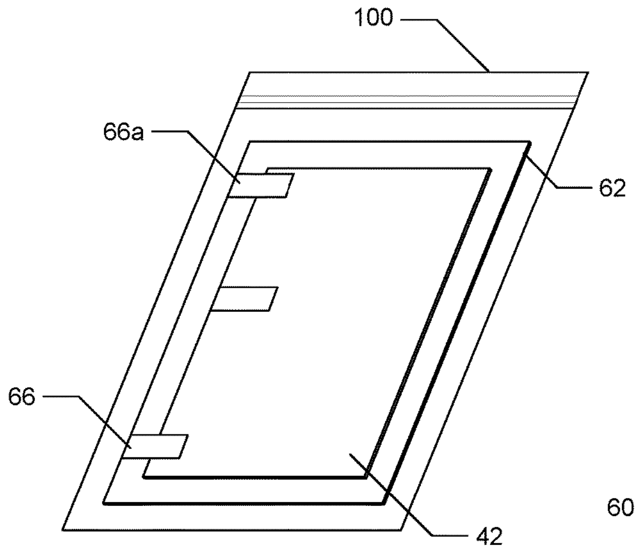
FIG. 5A is a perspective view of a suitable variation of an exemplary packaging of the present invention 10, wherein the present invention 10 is wrapped inside an individual plastic bag 100.
Figure 5B:
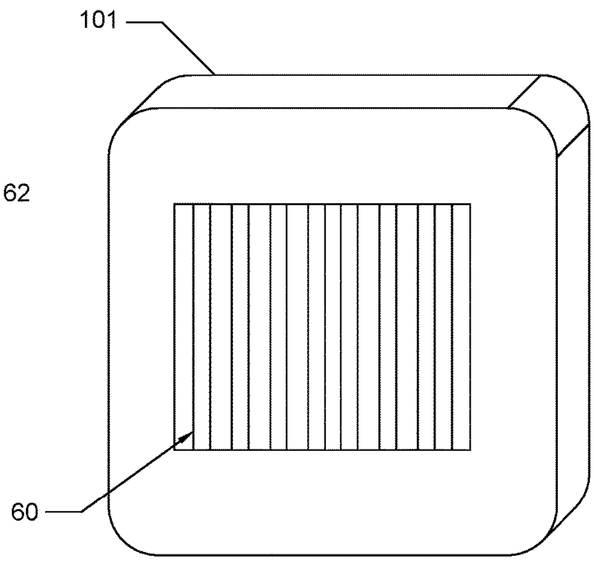
FIG. 5B is a perspective view of a suitable variation of an exemplary packaging of the present invention 10, wherein the present invention 10 and a plurality thereof may be wrapped inside a plastic bag 101.
Figure 5C:
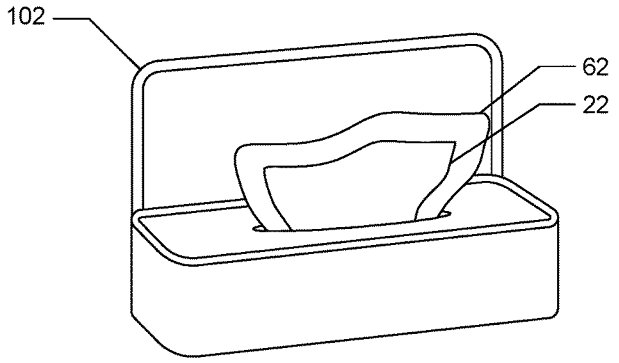
FIG. 5C is a perspective view of a suitable variation of an exemplary packaging of the present invention 10, wherein the present invention is housed inside a box holder 102, thereby the user may take one by one.

Referring to the figures and more particularly to FIGS. 5*a*, 5*b*, and 5*c*, the present invention 10 may be packaged into various exemplary embodiments, wherein FIG. 5*a* represents an individual packaging made of a plastic bag 100, FIG. 5*b* illustrates the present invention 10 and a plurality thereof packaged into a larger plastic bag 101, and FIG. 102 depicts a box holder 102 wherein the present invention is placed therein, thereby the user may take one by one.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A two-sided personal disposable sanitary wipe and dry device, comprising:

a cleaning assembly including a wet wipe, wherein said wet wipe is impregnated with a liquid solution by means of a proximal surface, wherein said wet wipe features an inner pull tab located adjacent to a lateral side thereof, wherein said inner pull tab is circumscribed about said wet wipe, wherein said inner pull tab sits on a top side of the wet wipe;

a drying assembly including a dry wipe, wherein said dry wipe is configured to interact with dirt, said dry wipe is attached to a wet protection layer; and a protection barrier assembly having said wet protection layer, said wet protection layer has a top surface to which an underside of the wet wipe is attached; the dry wipe is attached to an underside of said wet protection layer; wherein said wet protection layer has an area bigger than that of the wet wipe and the dry wipe; wherein, when attached, the dry wipe and the wet wipe rest circumscribed within a periphery of said protection layer; wherein said wet protection layer features outer pull tabs at a lateral side thereof, wherein each outer pull tab is proximal to a top edge and a bottom edge, respectively, of the wet protection layer; wherein the outer pull tabs extend past a periphery of said dry wipe from said lateral side.

2. The two-sided personal disposable sanitary wipe and dry device of claim 1, wherein said wet wipe has a rectangular shape.

3. The two-sided personal disposable sanitary wipe and dry device of claim 1, wherein said wet protection layer is made of an impermeable material.

4. The two-sided personal disposable sanitary wipe and dry device of claim 1, wherein said wet protection layer includes the inner pull tab to access said dry wipe.

5. The two-sided personal disposable sanitary wipe and dry device of claim 4, wherein said inner pull tab is made of a plastic material to prevent the inner pull tab from getting dirty while wiping.

6. The two-sided personal disposable sanitary wipe and dry device of claim 1, wherein said wet wipe and said dry wipe includes on a surface thereof a textured surface to enhance dirt and moisture removal.

7. A two-sided personal disposable sanitary wipe and dry device, consisting of:

a cleaning assembly including a wet wipe, said wet wipe has a rectangular shape, said wet wipe may be made of a moisture retainer material, wherein said wet wipe is impregnated with a cleansing liquid solution; wherein said wet wipe features an inner pull tab located adjacent to a lateral side thereof, wherein said inner pull tab is circumscribed about said wet wipe, wherein said inner pull tab sits on a top surface of the wet wipe;

a drying assembly including a dry wipe, said dry wipe has a rectangular shape, wherein said dry wipe is configured to interact with dirt by means of a proximal surface, said inner pull tab is rolled up to access said dry wipe; and a protection barrier assembly having a wet protection layer, said wet protection layer has a top surface to which an underside of the wet wipe is attached; the dry wipe is attached to an underside of said wet protection layer; wherein said wet protection layer has an area bigger than that of the wet wipe and the dry wipe; wherein, when attached, the dry wipe and the wet wipe rest circumscribed within a periphery of said protection layer; wherein said wet protection layer features outer pull tabs at a lateral side thereof, wherein each outer pull tab is proximal to a top edge and a bottom edge, respectively, of the wet protection layer; wherein the outer pull tabs extend past a periphery of said dry wipe from said lateral side, said wet protection layer is made of an impermeable material, said inner pull tab and said outer pull tabs are made of a plastic material to prevent getting dirt while wiping.

* * * * *